United States Patent
Takamiya et al.

(10) Patent No.: US 6,829,118 B1
(45) Date of Patent: Dec. 7, 2004

(54) OPTICAL ROTATIONAL POSITION INFORMATION DETECTING APPARATUS

(75) Inventors: Makoto Takamiya, Tokyo (JP); Naoki Kawamata, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 09/704,704

(22) Filed: Nov. 3, 2000

(30) Foreign Application Priority Data

Nov. 10, 1999 (JP) .......................................... 11-320309

(51) Int. Cl.[7] .......................... G11B 15/46; G11B 5/596
(52) U.S. Cl. ................................ 360/73.03; 360/77.03; 360/78.11; 356/27; 356/498
(58) Field of Search .......................... 360/73.03, 73.01, 360/75, 77.03, 78.04, 78.11, 78.15, 71, 51, 77.04; 356/493, 494, 498, 499, 521, 27

(56) References Cited

U.S. PATENT DOCUMENTS

| | | | |
|---|---|---|---|
| 5,483,332 A | 1/1996 | Takamiya et al. | 356/28.5 |
| 5,502,466 A | 3/1996 | Kato et al. | 356/356 |
| 5,629,793 A | 5/1997 | Takamiya et al. | 359/278 |
| 5,640,239 A | 6/1997 | Takamiya et al. | 356/345 |
| 5,737,116 A | 4/1998 | Kadowaki et al. | 359/359 |
| 5,754,282 A | 5/1998 | Kato et al. | 356/28.5 |
| 5,774,218 A | 6/1998 | Takamiya et al. | 356/356 |
| 5,796,470 A | 8/1998 | Ueda et al. | 356/28.5 |
| 5,812,250 A * | 9/1998 | Ishida et al. | 356/28.5 |
| 5,815,267 A | 9/1998 | Kato et al. | 356/356 |
| 5,831,720 A | 11/1998 | Ishida et al. | 356/28.6 |
| 5,926,276 A | 7/1999 | Takamiya et al. | 356/356 |
| 6,034,761 A | 3/2000 | Takamiya | 356/28.6 |
| 6,057,976 A * | 5/2000 | Ishida et al. | 360/77.03 |
| 6,151,185 A | 11/2000 | Ishizuka et al. | 360/78.04 |
| 6,473,184 B1 * | 10/2002 | Ishizuka et al. | 356/499 |

FOREIGN PATENT DOCUMENTS

JP  07-029229  1/1995

* cited by examiner

*Primary Examiner*—Andrew L. Sniezek
(74) *Attorney, Agent, or Firm*—Fitzpatrick, Cella, Harper & Scinto

(57) ABSTRACT

An apparatus for optically detecting rotational position information of a rotating object, includes a light source, a detector which is located at a position to receive scattered light from the rotating object when the rotating object is irradiated with a light beam from the light source, and outputs a frequency signal based on the scattered light, a signal processing system for detecting rotational position information by performing signal processing for the frequency signal from the detector, and a rotation control system for controlling rotation of the rotating object. The rotation control system preliminarily rotates the rotating object in detecting the rotational position information.

11 Claims, 15 Drawing Sheets

US 6,829,118 B1

OPTICAL ROTATIONAL POSITION INFORMATION DETECTING APPARATUS

BACKGROUND OF THE INVENTION

1. Field of the Invention

The present invention relates to an optical rotational position information detecting apparatus mainly used for an apparatus for outputting rotational position signals required as clock signals for a hard disk drive, a photosensitive drum rotational position signal output apparatus for a copying machine, or the like.

2. Related Background Art

FIG. 1A is a plan view of a conventional data writing/reading apparatus used for a data processing apparatus such as a computer. A magnetic disk 2 formed by, for example, coating a disk with a magnetic material is placed on an HDD (Hard Disk Drive) 1 serving as a data writing/reading apparatus. The HDD 1 has a magnetic head arm 4 having a magnetic head slider 3 mounted on its distal end. The magnetic head slider 3 writes an information signal on the magnetic disk 2. A voice coil motor 5 is mounted on the rear end portion of the magnetic head arm 4.

FIG. 1B is a plan view of the magnetic disk 2. FIG. 1C is a view for explaining a servo pattern. A plurality of sectors, each consisting of a servo pattern region and data region, are arranged outside a disk hub 2a of the magnetic disk 2.

In this arrangement, the magnetic disk 2 is set on the HDD 1, and the rotational position of the magnetic head arm 4 is forcibly set to a position corresponding to a desired track by a rotary positioner (not shown). The magnetic head arm 4 is then driven in the track direction to write a servo pattern of an information signal with a resolution ½ a data track using the magnetic head slider 3 on the distal end of the arm.

When a data signal is to be written on the circular magnetic disk 2 by using the magnetic head slider 3, a servo track signal as information for positioning the magnetic head slider 3 must be accurately written in advance. For this purpose, a magnetic signal must be written at a desired position on the magnetic disk 2 by accurately detecting position information of the rotational direction of the magnetic disk 2 as well as position information of the magnetic head slider 3 in the track direction which is the radial direction of the magnetic disk 2.

FIG. 1D is a perspective view of the HDD 1 having a magnetic clock head 7 that is used independently of a magnetic head 6 for writing information to accurately detect the rotational direction of the magnetic disk 2. According to this scheme, the magnetic clock head 7 enters the HDD 1 through an opening portion 8 and writes a clock signal of a rotational direction on an outermost peripheral portion of the magnetic disk 2. The rotational position of the magnetic disk 2 is then detected while the clock signal is read by the magnetic clock head 7, and a servo track signal is written on each track using the magnetic head 6 for writing information.

The service life of this magnetic clock head 7 is short because it is used to write clock signals on several ten thousand HDDs 1 in a short period of time. That is, the magnetic clock head 7 itself is a consumable item, and hence maintenance such as replacement is required, resulting in an increase in cost.

In addition, since the gap between the magnetic disk 2 and the magnetic clock head 7 must be kept very small, these members may contact each other for some cause. This structure is therefore structurally undesirable in efficiently and economically mass-producing HDDs 1.

As a means for solving this problem, a laser Doppler scheme of detecting the rotational position information of a rotating object by irradiating it with a laser beam is disclosed in Japanese Patent Application Laid-Open No. 7-29229. According to this laser Doppler scheme, since it is only required to irradiate the disk hub 2a of the magnetic disk 2 with a laser beam, no special part such as a scale needs to be bonded to the magnetic disk 2. In addition, owing to noncontact detection, the detecting unit does not wear.

FIG. 1E is a view showing the arrangement of a laser Doppler velocimeter. This device measures the moving velocity of a moving object by using the Doppler effect that when the moving object is irradiated with a laser beam, the frequency of light scattered by the moving object shifts in proportion to the moving speed. In this device, a laser source 11, collimator lens 12, beam splitter 13, and mirrors 14a and 14b are arranged. An object K to be measured, which moves in the direction indicated by the arrow at a velocity V, is placed in the reflection direction of the two mirrors 14a and 14b, and a condenser lens 15 and photodetector 16 are arranged on the optical path of light reflected by the object K.

In this arrangement, a laser beam emitted from the laser source 11 is collimated into a parallel light beam L1 by the collimator lens 12 and strikes the beam splitter 13 to be split into two light beams L2 and L3. These light beams are reflected by the mirrors 14a and 14b and strike the object K, which is moving at the velocity V, at an incident angle θ. Scattered light from the object K is detected by the photodetector 16 via the condenser lens 15.

The frequency of the scattered light beams originating from the two light beams respectively undergo Doppler shifts +Δf and −Δf. Letting λ be the wavelength of a laser beam, Δf is given by $$\Delta f = (V \sin\theta)/\lambda \qquad (1)$$

The scattered light beams having undergone the Doppler shifts +Δf and −Δf interfere with each other to cause brightness changes on the light-receiving surface of the photodetector 16. A frequency F at this time is given by $$F = 2\Delta f(2V \sin\theta)/\lambda \qquad (2)$$

If the Doppler frequency F of the photodetector 16 is measured according to equation (2), the velocity V of the object K can be obtained.

When the object K is a rotating object, the velocity V of the object K is given by $$V = 2\pi r W/60 \qquad (3)$$

where r is the irradiation radius and W (rpm) is the rotational velocity.

Equation (2) is finally rewritten into $$F = (\pi r W \sin\theta)/(15\lambda) \qquad (4)$$

If equation (4) is converted into a pulse count N for one revolution, equation (4) is rewritten into $$N = (4\pi r \sin\theta)/\lambda \qquad (5)$$

By detecting this pulse signal, rotational position information can be detected.

(1) It is, however, known that the above conventional optical rotational position information detecting means for detecting rotational position information by using a Doppler signal causes dropouts that are portions in which signal components are statistically omitted. It is therefore difficult to accurately identify a rotational position.

(2) In the above prior art, an NRRO (Non-Repeatable Run Out) corresponding to about 0.1 μm occurs when the magnetic disk 2 of the HDD 1 rotates. To write a stable servo signal, it is very important to form a clock signal while minimizing the influence of this NRRO.

SUMMARY OF THE INVENTION

It is an object of the present invention to solve the above problem (1) and provide an optical rotational position information detecting apparatus which accurately detects rotational position information in a circumferential direction on a rotating object that continuously rotates.

It is another object of the present invention to solve the above problem (2) and provide an optical rotational position information detecting apparatus which can perform accurate position detection by minimizing the influence of the run out of a rotating object.

DETAILED DESCRIPTION OF THE PREFERRED EMBODIMENTS

The present invention will be described in detail with reference to the embodiments shown in FIGS. 2A to 14.

Figure 2A:
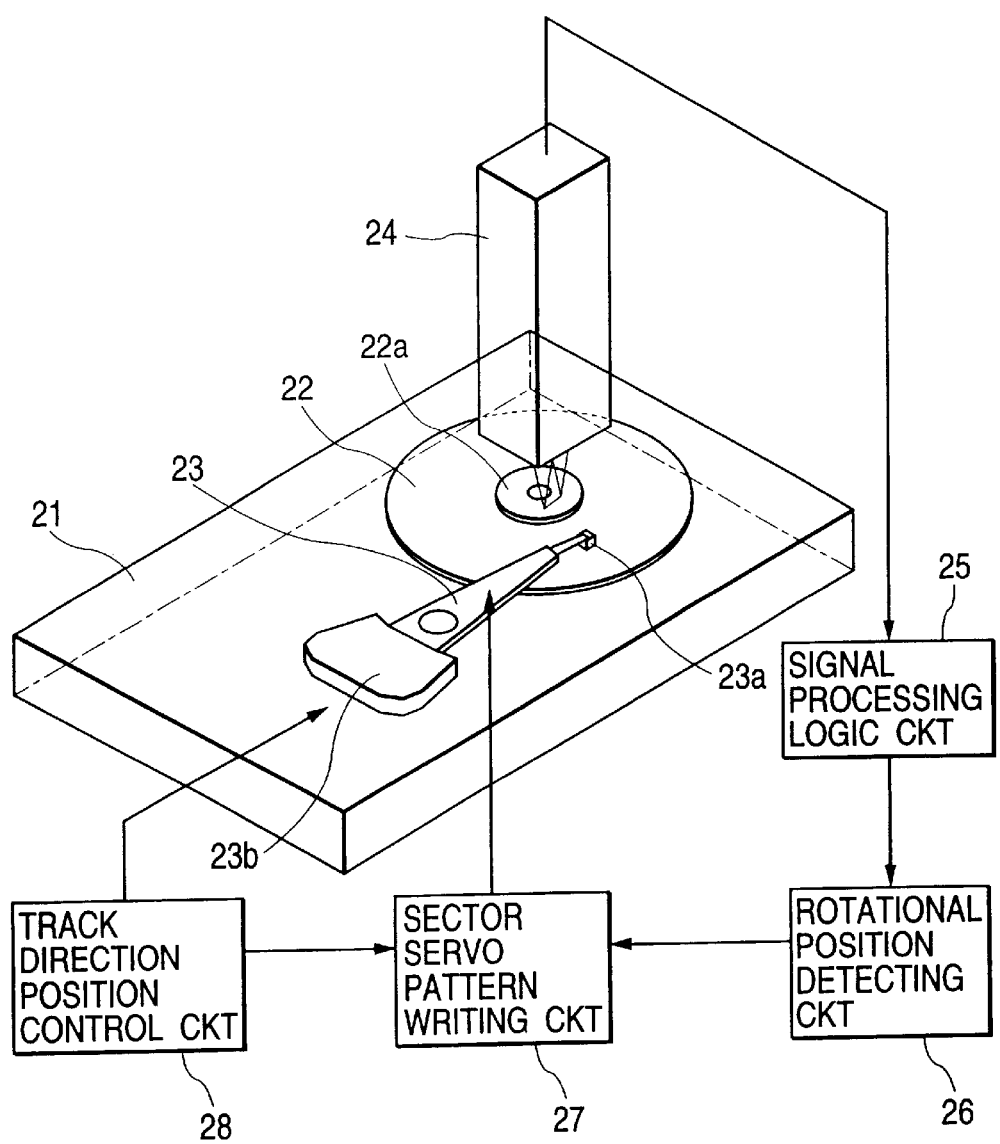
FIG. 2A is a perspective view of a hard disk drive according to the first embodiment.

FIG. 2A is a perspective view showing an HDD applied to a servo track writer according to the first embodiment. A magnetic disk 22 is placed on an HDD 21.

The HDD 21 has a magnetic head 23a which is mounted on the distal end of a magnetic head arm 23 and has a slider serving as a magnetic recording head for writing an information signal on the magnetic disk 22. An LDV (Laser Doppler Velocimeter) optical head 24 for detecting the rotational velocity of the magnetic disk 22 by irradiating a disk hub 22a of the magnetic disk 22 with a laser beam is placed above the HDD 21.

The output of the LDV optical head 24 is sequentially connected to a signal processing logic circuit 25, rotational position detecting circuit 26, sector servo pattern writing circuit 27, and magnetic head 23a. The output of a track direction position control circuit 28 is connected to the sector servo pattern writing circuit 27 and a rotary positioner (not shown).

With this arrangement, the track direction of the magnetic head 23a is sequentially controlled by the rotary positioner (not shown) in accordance with each track to write a servo track signal for each track on the magnetic disk 22 on the basis of the rotational position information of the magnetic disk 22 which is obtained from the signal processing logic circuit 25 for processing a Doppler signal from the LDV optical head 24.

Figure 2B:
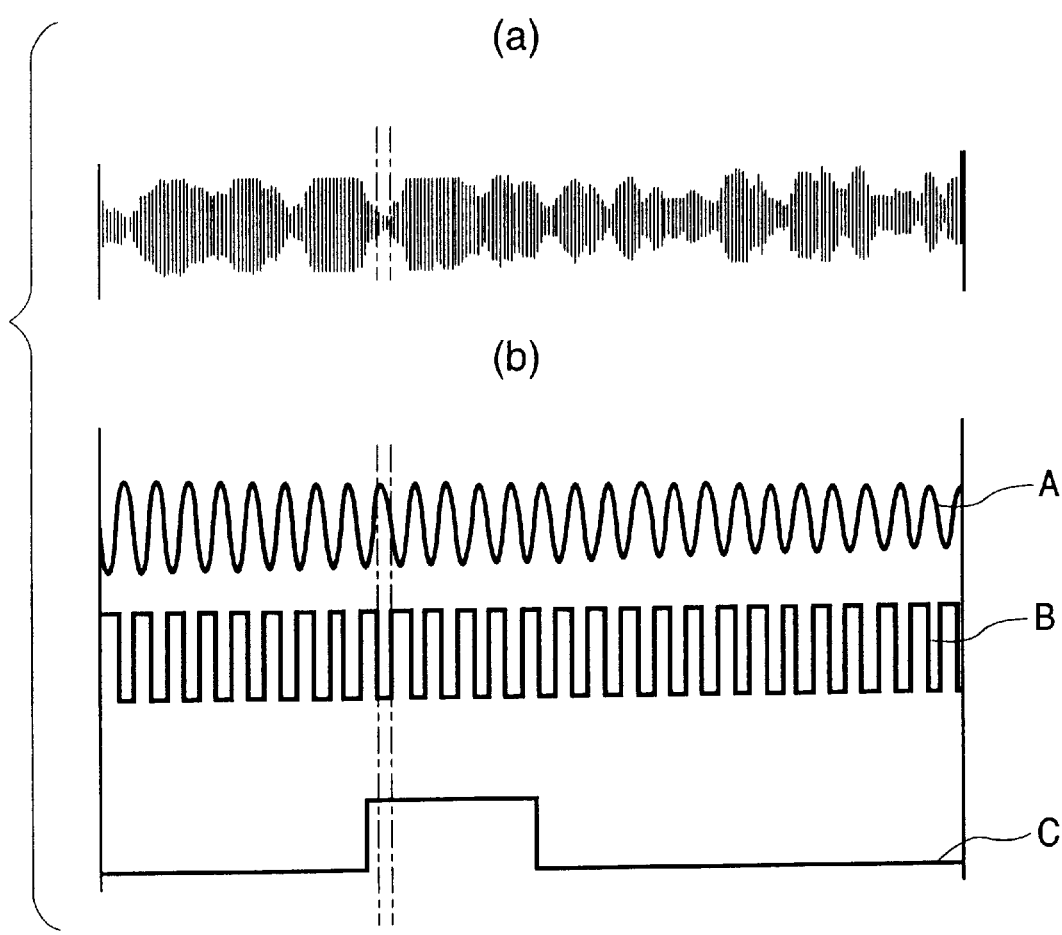
FIG. 2B is a graph showing a Doppler signal corresponding to a rotational position.

FIG. 2B(a) shows the amplitude of a Doppler signal from the LDV optical head 24 which corresponds to the rotational position. This signal amplitude exhibits repeatability with respect to the rotational position as long as the laser beam irradiation region of the disk hub 22a remains unchanged. FIG. 2B(b) shows a Doppler signal A, a waveform-shaped signal B obtained by converting the Doppler signal A, and a rotational position origin signal (rotational position index) C. The frequency of the Doppler signal A is proportional to the rotational velocity as long as the radius of the disk hub 22a at the laser beam irradiation position always remains the same.

Figure 3A:
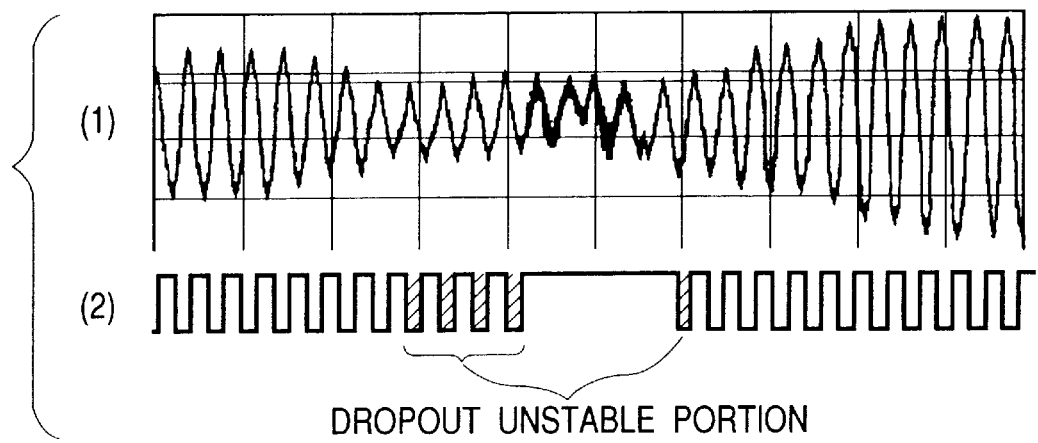
FIGS. 3A and 3B are graphs showing processed signals in the first embodiment.
Figure 3B:
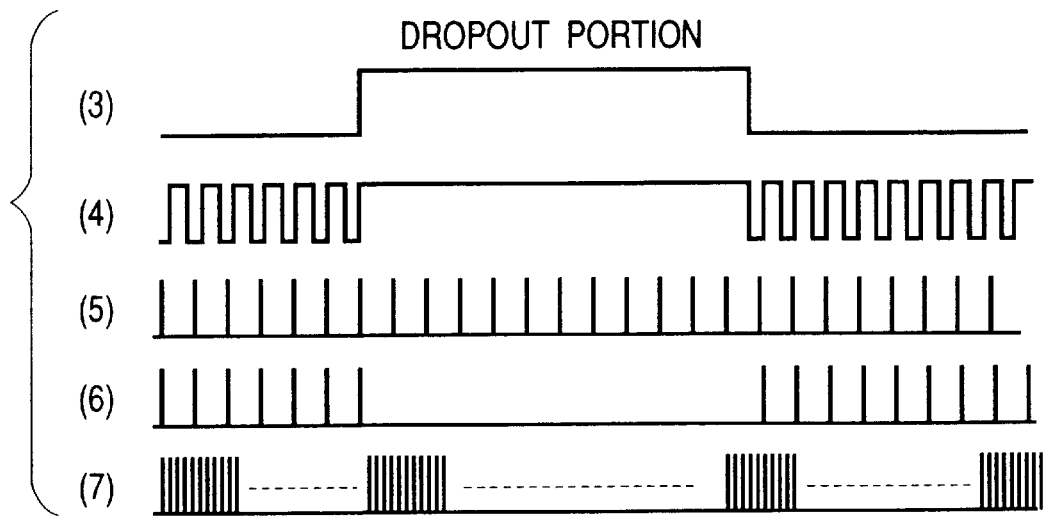

FIGS. 3A and 3B are graphs showing a signal processing method for a dropout portion of a Doppler signal in the first embodiment. Referring to FIG. 3A, a signal (1) indicates the envelope (repeatability) of a Doppler signal, and a signal (2) is a comparate signal. This comparate signal (2) is obtained by removing noise components from the Doppler signal (1) upon providing a threshold with hysteresis. A dropout can be detected by using the phenomenon that the comparate signal (2) cannot follow the Doppler signal (1) at a dropout portion. However, the signal amplitude is small at the position of a dropout, and the phase and amplitude of the Doppler signal (1) change even with slight vibrations. For this reason, even if this signal is waveform-shaped, it repeatability cannot be ensured.

FIG. 3B is a graph showing signal processing for identifying a dropout portion. First of all, a ¼ frequency signal (5) of a PLL oscillation signal (7) is synchronized (phase-locked) to a Doppler comparate signal in the interval between a rotational position origin signal which is not a dropout portion and the first dropout portion. Subsequently, a dropout identification signal (3) including a dropout unstable portion like the one shown in FIG. 3A is stored by counting the pulses of the PLL oscillation signal (7) from the rotational position origin signal (rotational position index).

At a dropout portion, the voltage value of a VCO (not shown) used for the PLL oscillation signal (7) is fixed and oscillated at an oscillation frequency immediately preceding the dropout. Since the dropout portion corresponds to a distance of several 10 μm, the rotational velocities before and after the dropout can be regarded as almost equal. By counting the pulses of the PLL oscillation signal (7) during the dropout, therefore, the dropout identification signal (3) exhibiting good repeatability of the dropout start and avoidance timings can be generated.

As is obvious from a signal (4) and the signal (5) in FIG. 3B, the phase of a Doppler signal before a dropout often differs from that after the dropout. To prevent such a phase shift in signal processing, the PLL oscillation signal (7) obtained by multiplying the frequency of a Doppler comparate signal by two or more (four) is used as a signal for detecting dropout avoidance.

Assume that the PLL reference signal obtained by this method is the signal (4) obtained by ORing the signals (2) and (3). A phase comparison signal (6) is almost synchronized to the rising point of the signal (4) after the dropout avoidance, and the number of pulses of the PLL oscillation signal (7) switched from the dropout identification signal (3) is stored. At a portion other than a dropout, the phase comparison signal (6) synchronizes (phase-locks) the ¼ frequency signal (5) of the PLL oscillation signal (7) to the Doppler comparate signal (4).

There are several 10 dropout portions during one revolution. For this reason, the numbers of PLL oscillation signal pulses in regions which are not dropouts and dropout regions are sequentially stored, with reference to the rotational position origin, so as to cover no dropout uncertain regions, and dropout portions corresponding to one revolution are identified, thereby determining the final dropout identification signal (3).

Figure 4:
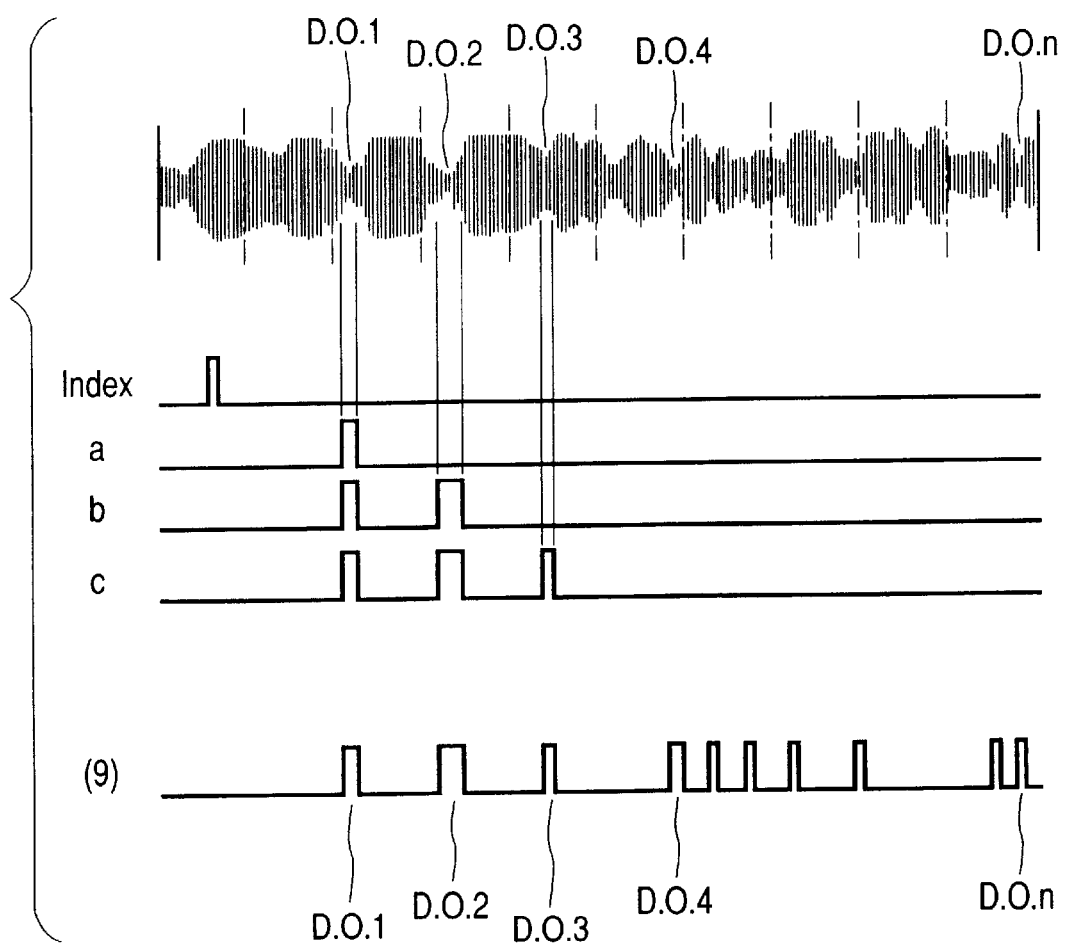
FIG. 4 is a view showing the flow of storage of dropouts.

FIG. 4 shows the flow of operation of sequentially storing dropouts. First of all, a count value from the index of the PLL oscillation signal (7) to a first dropout D.O.1 is stored at the first revolution. With this operation, a PLL oscillation signal free from the instability of D.O.1 can be obtained. A count value from the index of the PLL oscillation signal (7) corresponding to a next dropout D.O.2 is stored after the above processing is performed at the second revolution by using the dropout identification signal (2), and the PLL oscillation signal in the interval between the index and dropout D.O.2 is stabilized. This makes it possible to obtain the PLL oscillation signal (7) free from the instability of the dropouts D.O.1 and D.O.2.

Likewise, n D.0. portions that exist during one revolution are sequentially stored at D.0.3, D.0.4, . . . , D.0.n, i.e., the third revolution, fourth revolution, . . . , nth revolution, thereby determining a last dropout identification signal corresponding to one revolution.

As de scribed above, if a dropout portion can be fixed, instability, i.e., random signal phase changes before and after a dropout, can be eliminated., If a dropout identification signal (9) from the rotational position origin can be determined, the PLL reference signal (4) that is stable throughout one revolution can be generated by ORing the Doppler comparate signals (2) and (3) detected in real time. In addition, the PLL phase comparison signal (6) that is stable throughout one revolution is generated from the PLL oscillation signal (7) and signal (3).

By performing PLL oscillation using the PLL reference signal (4) and phase comparison signal (6), therefore, the PLL oscillation signal (7) that is stable throughout one revolution can be generated, thus obtaining a stable signal equivalent to an encoder signal.

PLL oscillation pulses for one revolution can be determined by counting them in response to several rotational position origins as triggers. Subsequently, a rotational position origin can be detected/generated by counting the number of PLL oscillation pulses. This will obviate the necessity for an external origin signal. In addition, in this case, the same signal processing is always performed at the same rotational position, and closed processing (closed loop) is performed for one revolution, thus making signal processing for PLL oscillation more stable and realizing good signal repeatability.

Figure 5:
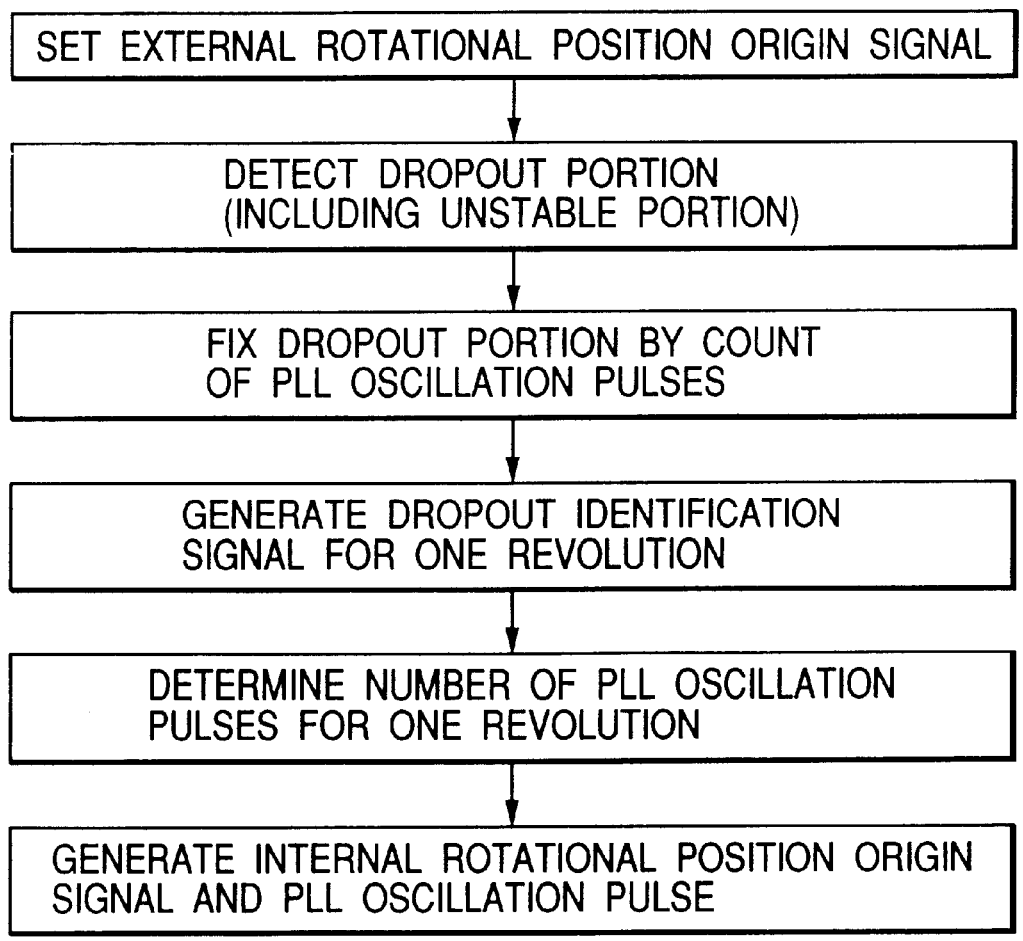
FIG. 5 is a flow chart showing signal processing.

FIG. 5 is a flow chart showing a signal processing logic R3, in which an origin signal is written as an external original signal on the magnetic disk 22 by the magnetic head 23a before a servo track signal is written, and the origin signal is read by the magnetic head 23a. In this case, after a dropout identification signal for one revolution is preliminarily determined by rotating the magnetic disk 22, an origin signal can be generated by the signal processing logic R3 of the LDV optical head 24. Therefore, no external origin signal is required to write a servo track signal. In setting an external original signal, stable switching to the origin signal can be performed by the signal processing logic R3 by selecting a portion which is not a dropout region. According to this method, since no external origin sensor is required, a servo track write with a simple arrangement can be implemented, thus providing a practical system.

Figure 6A:
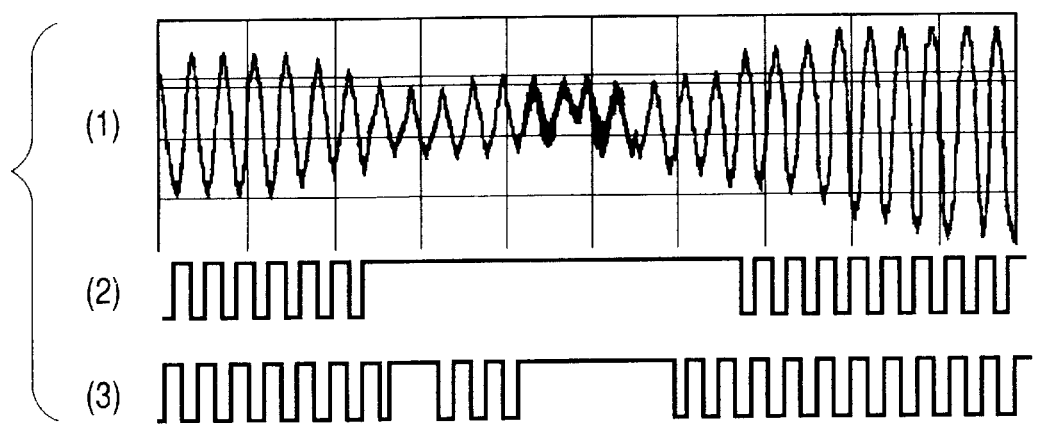
FIGS. 6A and 6B are graphs showing processed signals in the second embodiment.
Figure 6B:
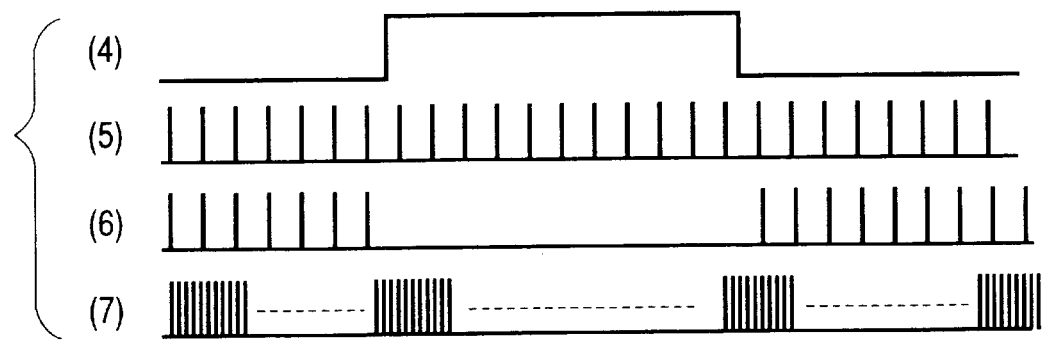

FIGS. 6A and 6B are graphs showing a signal processing method according to the second embodiment. This signal processing method is used to accurately detect a rotational position even if a Doppler signal undergoes a dropout state.

Referring to FIG. 6A, a signal (1) is a Doppler signal, and a signal (2) is a comparate signal. This comparate signal (2) is set at HI at a zero level, i.e., a falling point, of the signal (1) and set at LO at a threshold with hysteresis, i.e., a rising point, of the signal (1), thus removing noise components from the Doppler signal (1). A signal (3) is obtained by advancing the Doppler signal (1) by $3/16$ phase and setting a threshold to be smaller than that of the comparate signal (2).

FIG. 6B is a graph showing signal processing performed upon detection of a dropout portion. In detecting a dropout, when the signal (2) is kept at H level, a dropout start is detected, and when the signal (2) goes to L level, a dropout end is detected. In addition, when the signal (2) is set at H level at a rising point of the signal (3), a dropout start is detected. When the signal (2) is set at L level, a dropout end is detected. This makes it possible to always detect a dropout at the timing preceding a rising point of the signal (2) by $3/16$ phase. Note that a signal (4) is a dropout detection signal.

First of all, a ⅛ frequency signal (5) of a PLL oscillation signal (7) is synchronized (phase-locked) to a Doppler comparate signal in the interval between a rotational position original signal corresponding to a non-dropout portion and the first dropout portion. At a dropout portion, i.e., when the dropout detection signal (4) is at H level, the voltage value of a VCO (Voltage-Controlled Oscillator) (not shown) used for the PLL oscillation signal (7) is fixed and oscillated at an oscillation frequency immediately preceding the dropout. More specifically, a signal (6) generated by resetting the ⅛ frequency signal of the PLL oscillation signal (7) as a PLL phase comparison signal using the dropout detection signal (4) is used to prevent the signal (2) serving as a PLL reference signal and the phase comparison signal (6) from rising at the time of the dropout. This makes the VCO keep oscillating without frequency adjustment of the PLL oscillation signal (7).

Since the dropout portion corresponds to a distance of several 10 $\mu$m, the rotational velocities before and after the dropout can be regarded as almost equal. In this case, the comparison between the signals (2) and (5) reveals that the phase of the Doppler signal (1) before the dropout differs from that after the dropout. In this embodiment, to preliminarily detect this phase shift by signal processing, detection is performed after dropout avoidance at the timing preceding a rising point of the comparate signal (2) by $3/16$ phase. The signal (6) to be synchronized to the comparate signal (2) is generated at the third pulse of the 8-times frequency-multiplied PLL oscillation signal (7) after a falling point of the detection signal (4). The PLL oscillation signal (7) is then frequency-divided by 8 until the next dropout, thereby achieving phase locking.

The PLL phase comparison signal (6) obtained by this method may shift from the PLL reference signal (2) by a quantization error ($\pm 1/16$ phase) at a rising point after dropout avoidance. However, as the PLL multiplication number is increased, the error can be neglected.

When the PLL phase comparison signal (6) is generated without preliminary detection, the quantization error becomes a positive $1/8$ phase, and the quantization error accumulation always increases. In contrast to this, if dropouts are preliminarily detected as in this embodiment, quantization errors can be assigned to positive and negative values. This makes it possible to bring the average of quantization error accumulations to zero without increasing them in one direction.

In general, the number of dropouts for one revolution is 100 or less. If, therefore, the PLL multiplication number is 128, a variation in the number of PLL oscillation pulses for one revolution (rotation detection error) is not $\pm 1/2$ pulse or more at maximum in terms of the number of pulses of the Doppler signal (1). This makes it possible to set a gate at the position of a rising point of the Doppler signal (1) at the same rotational position with the number of PLL oscillation pulses and generate a rotational position original signal on the basis of a rising point of the Doppler signal (1) having passed through the gate. If the number of pulses of the PLL oscillation signal (7) is reset to coincide with this rotational position origin signal, a rotational position can be detected by reading the number of PLL oscillation pulses, thus implementing a noncontact-type rotational position detecting system requiring no scale.

Figure 7:
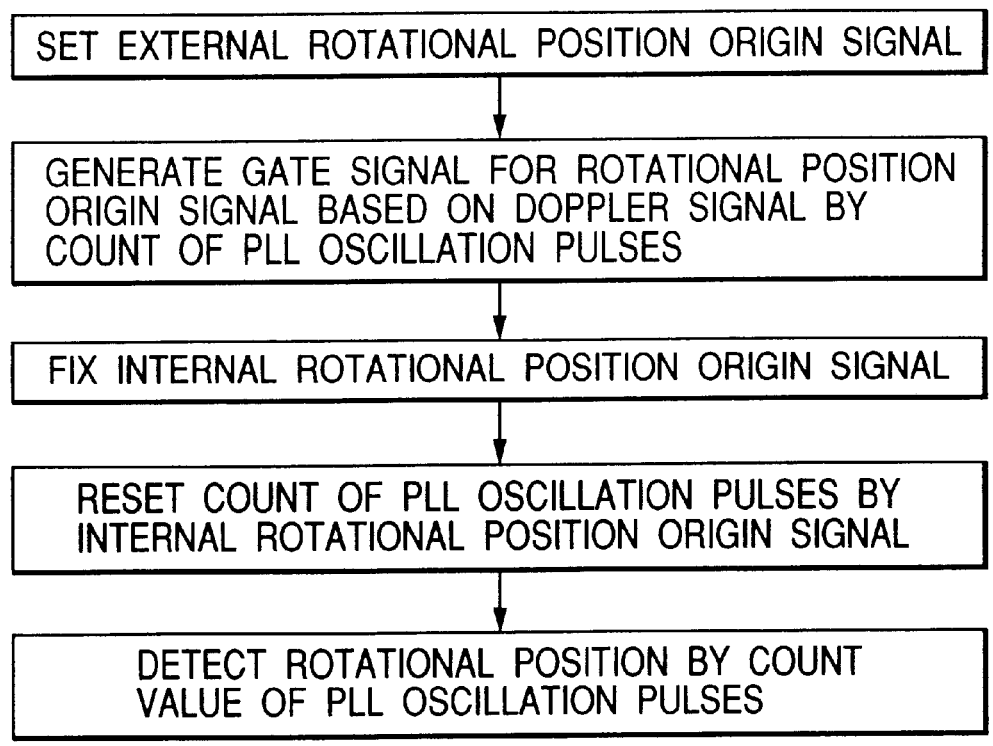
FIG. 7 is a flow chart showing signal processing.

FIG. 7 is a flow chart showing a signal processing logic R1, in which an origin signal is written as an external original signal on the magnetic disk 22 by the magnetic head 23a before a servo track signal is written, and the original signal is read by the magnetic head 23a. In this case, the magnetic disk 22 is preliminarily rotated to check the number of PLL oscillation signal pulses for one revolution, and a gate is set at the position of a rising point of the Doppler signal (1) at the same rotational position. With this operation, since an origin signal can be generated by the signal processing logic R1 using the LDV optical head 24, no external origin signal is required to write a servo track signal. By reading the number of PLL oscillation pulses in this manner, a rotational position is detected.

Figure 8:
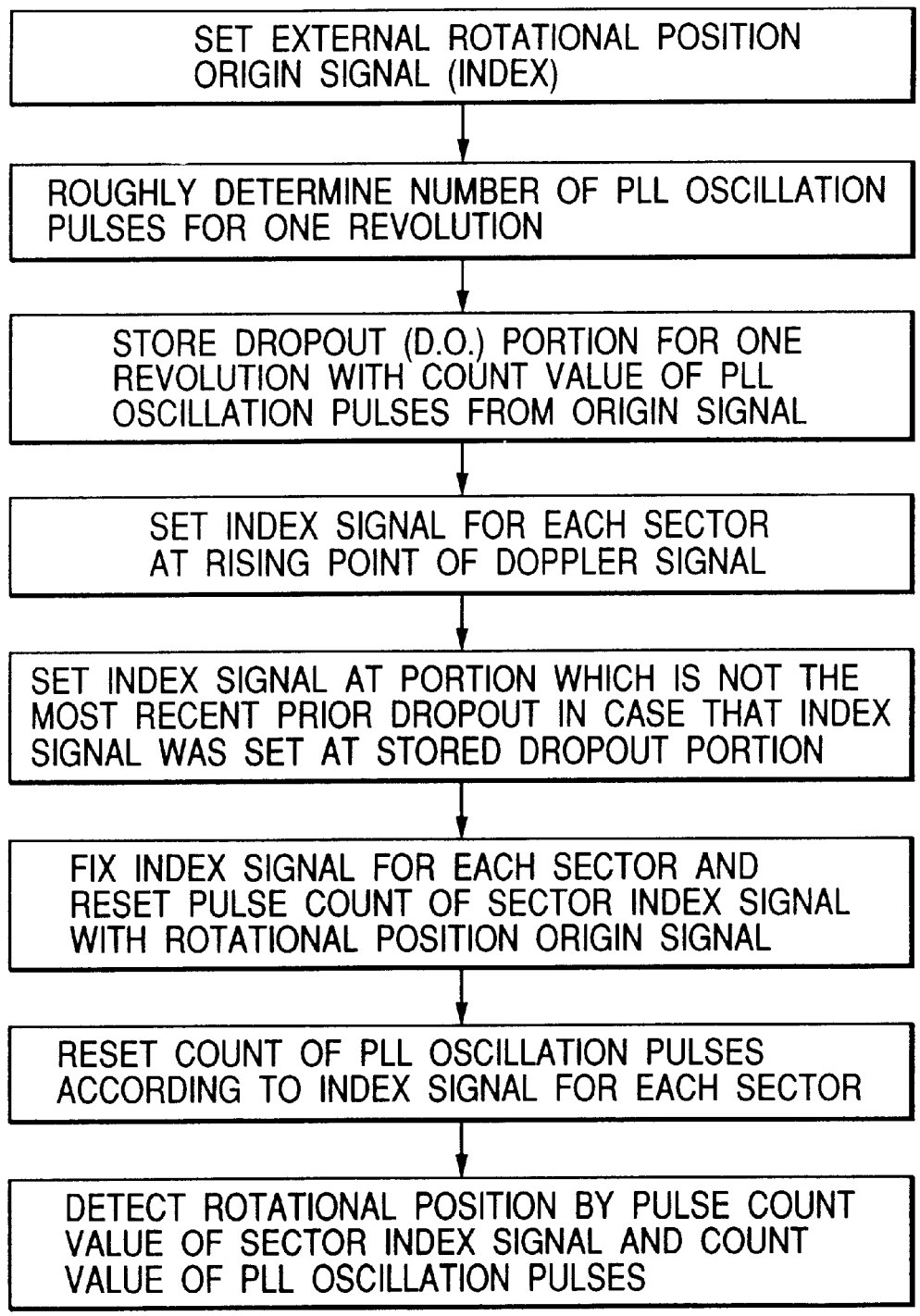
FIG. 8 is a flow chart showing signal processing according to the third embodiment.

FIG. 8 is a flow chart showing a signal processing logic R2 according to the third embodiment, in which an origin signal is written as an external original signal on a magnetic disk 22 by a magnetic head 23a before a servo track signal is written, and the original signal is read by the magnetic head 23a. In this case, the magnetic disk 22 is preliminarily rotated to check the number of PLL oscillation pulses for one revolution, and at the same time, a dropout portion corresponding to a rotational position is checked and roughly stored with the number of PLL oscillation pulses.

Subsequently, an index signal for each of a plurality of sectors (about 50 in general) is set at a rising point of a Doppler signal (1) independently of an external origin signal. If the index position coincides with the stored dropout portion, an index signal is set at a portion which is not the most recent prior dropout. When the number of PLL oscillation pulses is reset in accordance with this index signal, a reset PLL oscillation signal (7) does not include any instability of signal processing due to a dropout but includes only a quantization error ($\pm 1/16$ phase) of a PLL phase comparison signal (6). By reading both the count number of pulses of this index rotational signal and the count number of PLL oscillation pulses, a rotational position can be accurately detected.

In the second embodiment, a quantization error accumulation for one revolution can become a rotational position detection error. In contrast to this, this embodiment is configured to disperse a quantization error accumulation to a fraction of the number of sectors (about 50), and hence is effective especially when a strict rotational position detection accuracy is required. By using this method, even in the Doppler signal (1) including dropouts, rotational position detection with very high repeatability can be realized without excessively increasing the frequency of the PLL oscillation signal (7). In this embodiment, when a sector index signal is identified, no external origin signal is required.

Figure 9:
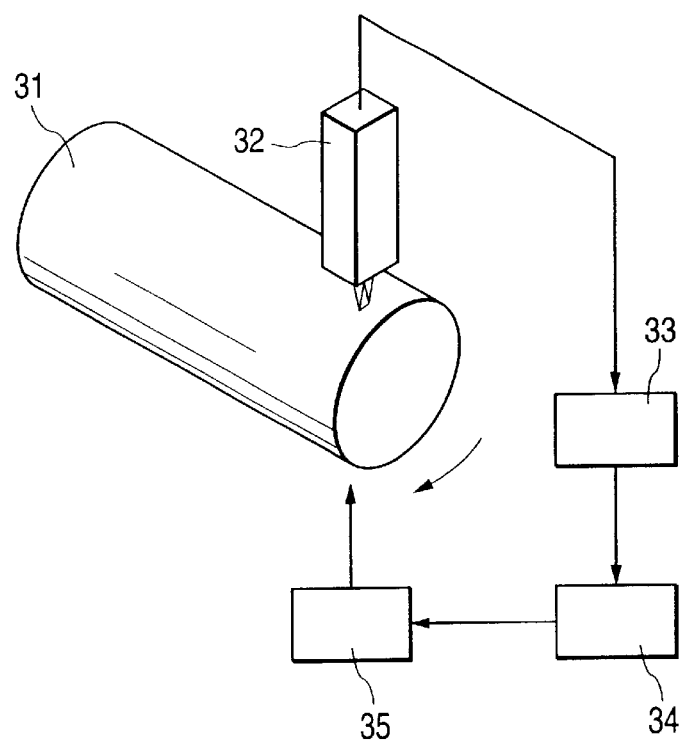
FIG. 9 is a view showing the arrangement of the main part of the fourth embodiment.

FIG. 9 is a perspective view showing the main part of the fourth embodiment, in which the present invention is applied to a system for detecting the outer surface moving distance of a photosensitive drum 31. The output of an LDV optical head is connected to the photosensitive drum 31 via a signal processing logic circuit 33, outer surface rotational position detecting circuit 34, and rotational driving control circuit 35.

Conventionally, the outer surface moving amount of the photosensitive drum 31 is detected by using a rotary encoder. In this method, however, if the outer surface of the photosensitive drum 31 is eccentric with respect to the rotational axis, the detected moving amount from the rotary encoder deviates from the actual outer surface moving amount of the photosensitive drum 31 in proportion to a radial error. Therefore, a mechanical arrangement with no eccentricity is required. For this reason, in this embodiment, a signal from the LDV optical head is detected by the outer surface rotational position detecting circuit 34 via the signal processing logic circuit 33 to make the rotational driving control circuit 35 control the rotation of the photosensitive drum 31. As described above, since an outer surface moving amount is detected by using a light beam from the LDV optical head, rotational position information from which eccentricity is removed can be quickly detected.

This embodiment presents a method of controlling the rotational driving of the photosensitive drum 31. For example, the accuracy of final transfer characteristics can be improved by performing feedback to driving control on another transfer system or feedback to control on an exposure process. This processing can be performed in the same manner as a signal processing logic R3 in FIG. 12. In addition, a signal from a low-resolution rotary encoder (not shown) is used as an external signal to accurately detect an outer surface rotational moving amount.

The fifth embodiment will be described next. An apparatus of this embodiment has the same arrangement as that of the first embodiment in FIG. 2A, and hence an illustration of this arrangement will be omitted. An RRO (Repeatable Run Out) and NRRO (Non-Repeatable Run Out) are present on a magnetic disk 22, and the RRO occurs in the same manner at the same rotational position. Even if, therefore, this RRO is present as a detection error, since identical detection errors are superimposed on the respective tracks, no write error occurs when a servo track signal is written. On the other hand, detection errors due to the NRRO are randomly superimposed on the respective tracks. To accurately write a servo track signal, therefore, it is important to minimize the detection errors due to the NRRO.

Figure 10:
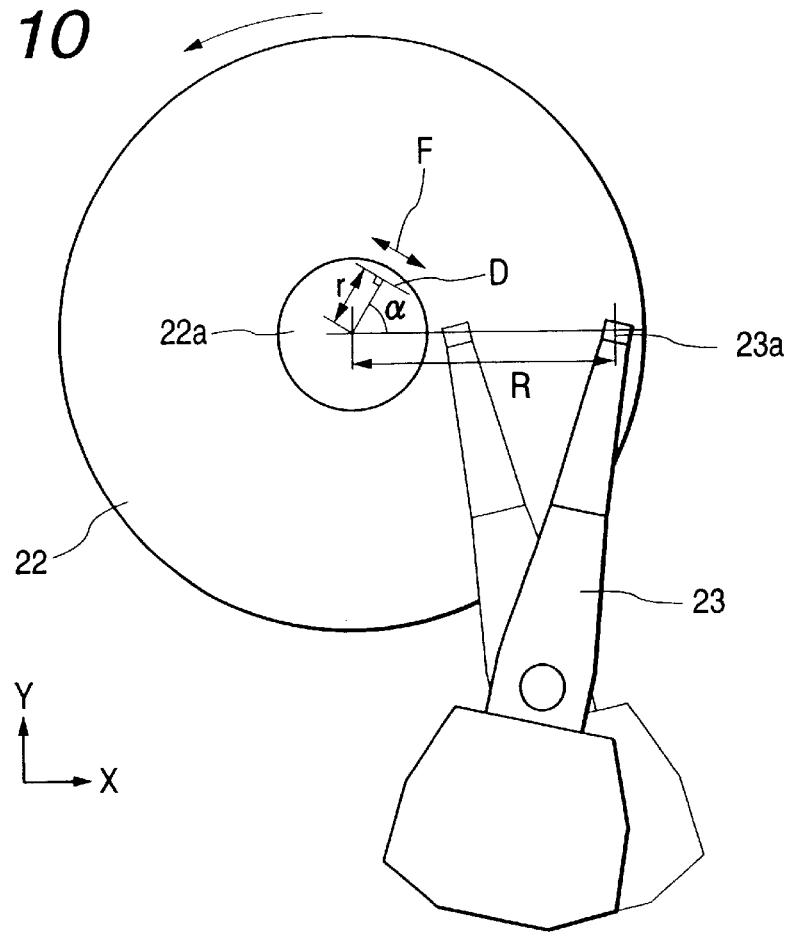
FIG. 10 is a view for explaining the positional relationship associated with the detection direction of an LDV optical head.
Figure 11:
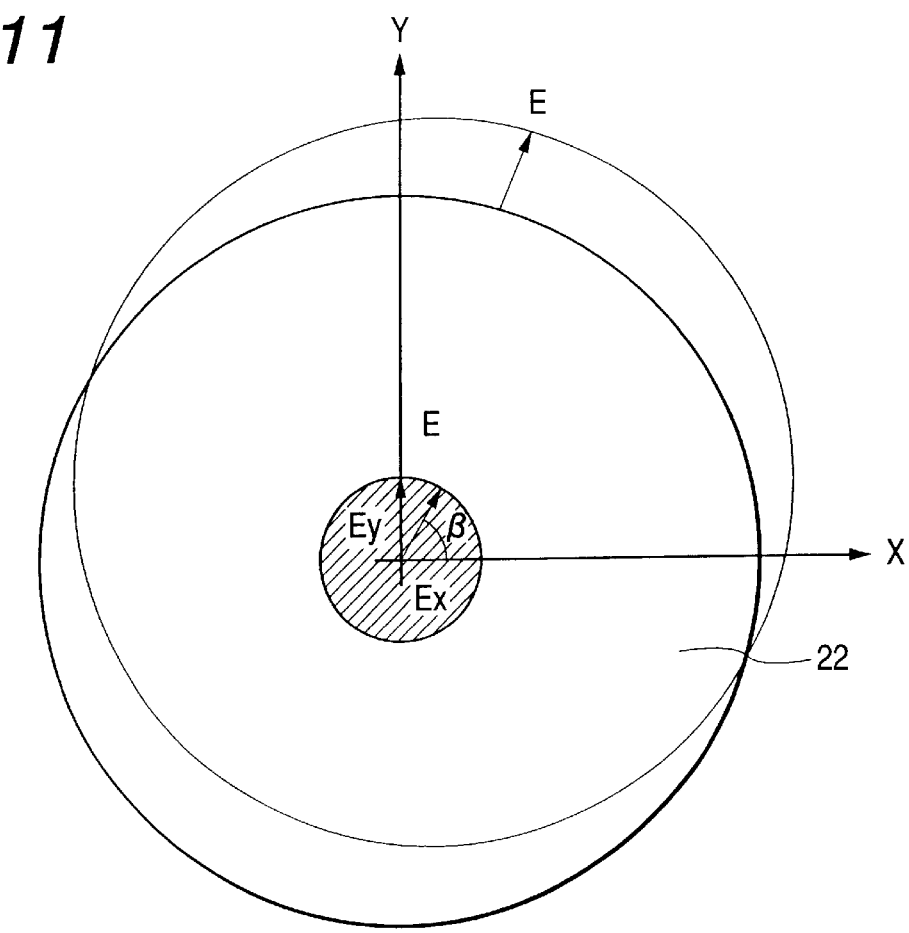
FIG. 11 is a view for explaining a non-repeatable run out.

FIG. 10 is a plan view showing the positional relationship between the magnetic disk 22, a magnetic head 23a, and the detection direction of an LDV optical head 24. Assume that the direction of the magnetic head 23a with respect to the center of the magnetic disk 22 is the x-axis. In this case, letting Ex be a vibration component in the x-axis direction with respect to a vibration width E of the NRRO, Ey be a vibration component in the y-axis direction, α be the angle of a perpendicular line in an LDV detection direction F with respect to the x-axis, and r be the radius of the magnetic disk 22 at an LDV detection position D, a detection error component S of the NRRO which exerts an influence in the LDV detection direction F is given by $$S = -Ex \cdot \sin \alpha + Ey \cdot \cos \alpha \tag{6}$$

A radial error component V of a run out NR which exerts an influence in the perpendicular direction of LDV detection is given by $$V = Ex \cdot \cos \alpha + Ey \cdot \sin \alpha \tag{7}$$

Therefore, letting R be the distance between the rotational center of the magnetic disk 22 and the magnetic head 23a, an LDV detection error E due to the NRRO on the magnetic head 23a is given by $$E = (R/r) \cdot S \cdot (r+V)/r \tag{8}$$

In this case, since $V \leq E \ll r$, equation (8) can be approximated as follows:

$$E \simeq (R/r) \cdot S = (R/r) \cdot (-Ex \cdot \sin \alpha + Ey \cdot \cos \alpha) \tag{9}$$

If this write position deviation is converted into a write angle deviation ω, then $$\omega = W/R = (1/r) \cdot (-Ex \cdot \sin \alpha + Ey \cdot \cos \alpha) - Ey/R \tag{10}$$

In general, the NRRO has a direction-independent vibration width E, and its angle β takes a random value satisfying $0 \leq \beta < 2\pi$. This indicates that the center of the magnetic disk 22 randomly deviates within the range indicated by the hatched portion in FIG. 11.

In this case, the vibration component Ex of the run out NR in the x-axis direction and the vibration component Ey in the y-axis direction are expressed with E and β as follows:

$$Ex = E \cdot \cos \beta, \quad Ey = E \cdot \sin \beta \tag{11}$$

A substitution of equation (11) into equation (10) yields $$\omega = (E/r) \cdot \{-\cos \beta \cdot \sin \alpha + \sin \beta \cdot (\cos \alpha - r/R)\} \tag{12}$$

In this case, since the angle β can take a random value within the range of $0 \leq \beta < 2\pi$, the write angle deviation |ω| due to the NRRO at the mounting angle α of the LDV optical head 24 can take a value that is equal to the maximum value at an angle β in equation (13):

$$|\omega| = |(E/r) \cdot \{-\cos \beta \cdot \sin \alpha + \sin \beta \cdot (\cos \beta - r/R)\}| \tag{13}$$

A condition required for the angle β in equation (13) to take a maximum value is dA/dβ=0 according to equation (14) below:

$$A = -\cos \beta \cdot \sin \alpha + \sin \beta \cdot (\cos \alpha - r/R) \tag{14}$$

Therefore, dA/dβ can be written into $$\begin{aligned} dA/d\beta &= \sin\beta \cdot \sin\alpha + \cos\beta \cdot (\cos\alpha - r/R) \\ &= \cos(\beta - \alpha) - (r/R) \cdot \cos\beta \\ &= \sin(\beta + \pi/2 - \alpha) - (r/R) \cdot \cos\beta \end{aligned}$$

According to equations (15), equation (16) is established:

$$c = \sin(\pi/2-a)-r/R = \cos\alpha - r/R \quad d = \cos(\pi/2-a) = \sin\alpha \sin\Phi = c/(c^2+d^2)^{1/2} \cos\Phi = d/(c^2+d^2)^{1/2} \tag{15}$$

$$dA/d\beta = (c^2+d^2)^{1/2} \cdot \sin(\beta+\Phi) \tag{16}$$

If dA/dβ=0, then β=–Φ according to equation (16).

According to equations (15), a condition required for the angle β in equation (13) to take a maximum value is expressed by $$\sin \beta = -c/(c^2+d^2)^{1/2} \quad \cos \beta = d/(c^2+d^2)^{1/2} \tag{17}$$

A substitution of equation (17) into equation (14) yields $$\begin{aligned} A &= \{-d \cdot \sin\alpha - c \cdot (\cos\alpha - r/R)\}/(c^2 + d^2)^{1/2} \\ &= -\{\sin^2\alpha + (\cos\alpha - r/R)^2\}/\{\sin^2\alpha + (\cos\alpha - r/R)^2\}^{1/2} \\ &= \{\sin^2\alpha + (\cos\alpha - r/R)^2\}^{1/2} \end{aligned} \tag{18}$$

With operation, a maximum value ωmax of a write angle deviation |ω| by NRRO is given by $$\begin{aligned} \omega\max &= |-(E/r) \cdot \{\sin^2\alpha + (\cos\alpha - r/R)^2\}^{1/2}| \\ &= (E/r) \cdot \{1 + (r/R)^2 - 2 \cdot (r/R) \cdot \cos\alpha\}^{1/2} \end{aligned} \tag{19}$$

As is obvious from equation (19), if R is a constant, ωmax is minimum when α=0 rad.

Figure 12:
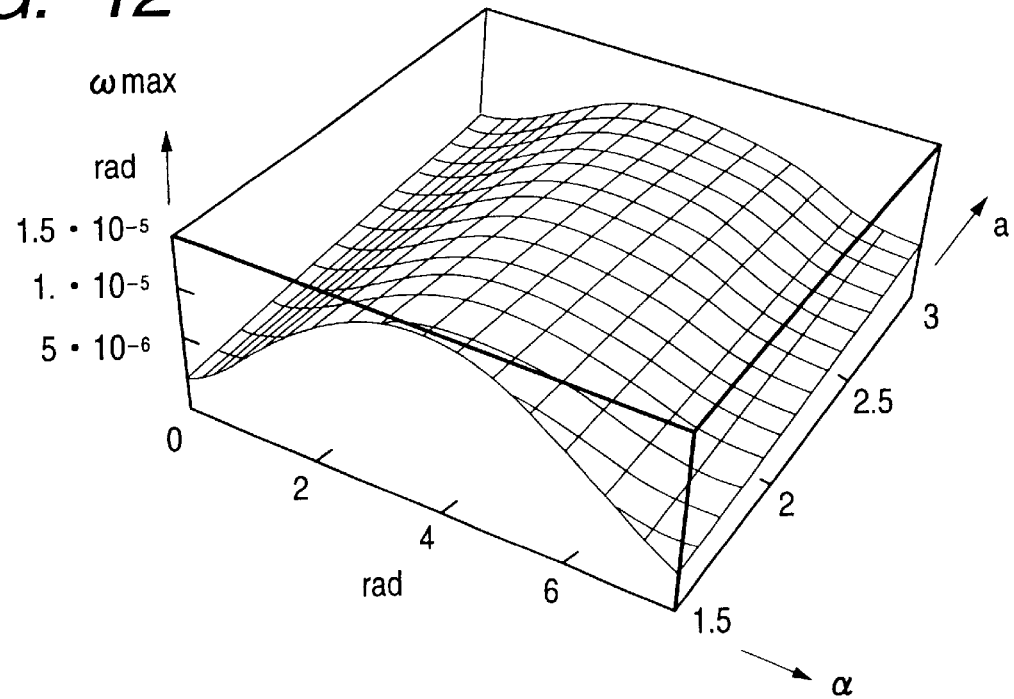
FIG. 12 is a graph showing write angle deviations at LDV angles and magnetic head positions.
Figure 13:
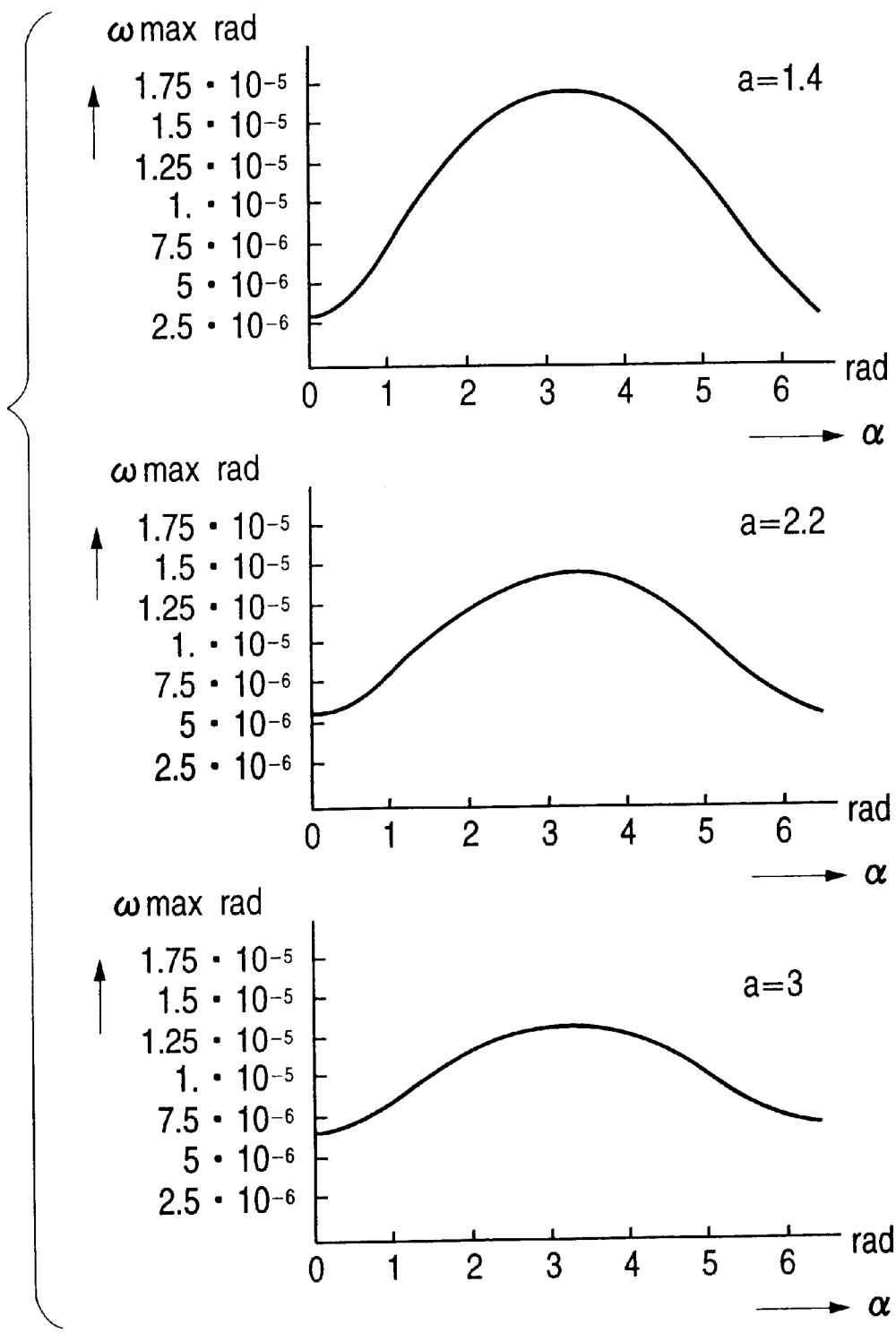
FIG. 13 is a graph showing write angle deviations at LDV angles.
Figure 14:
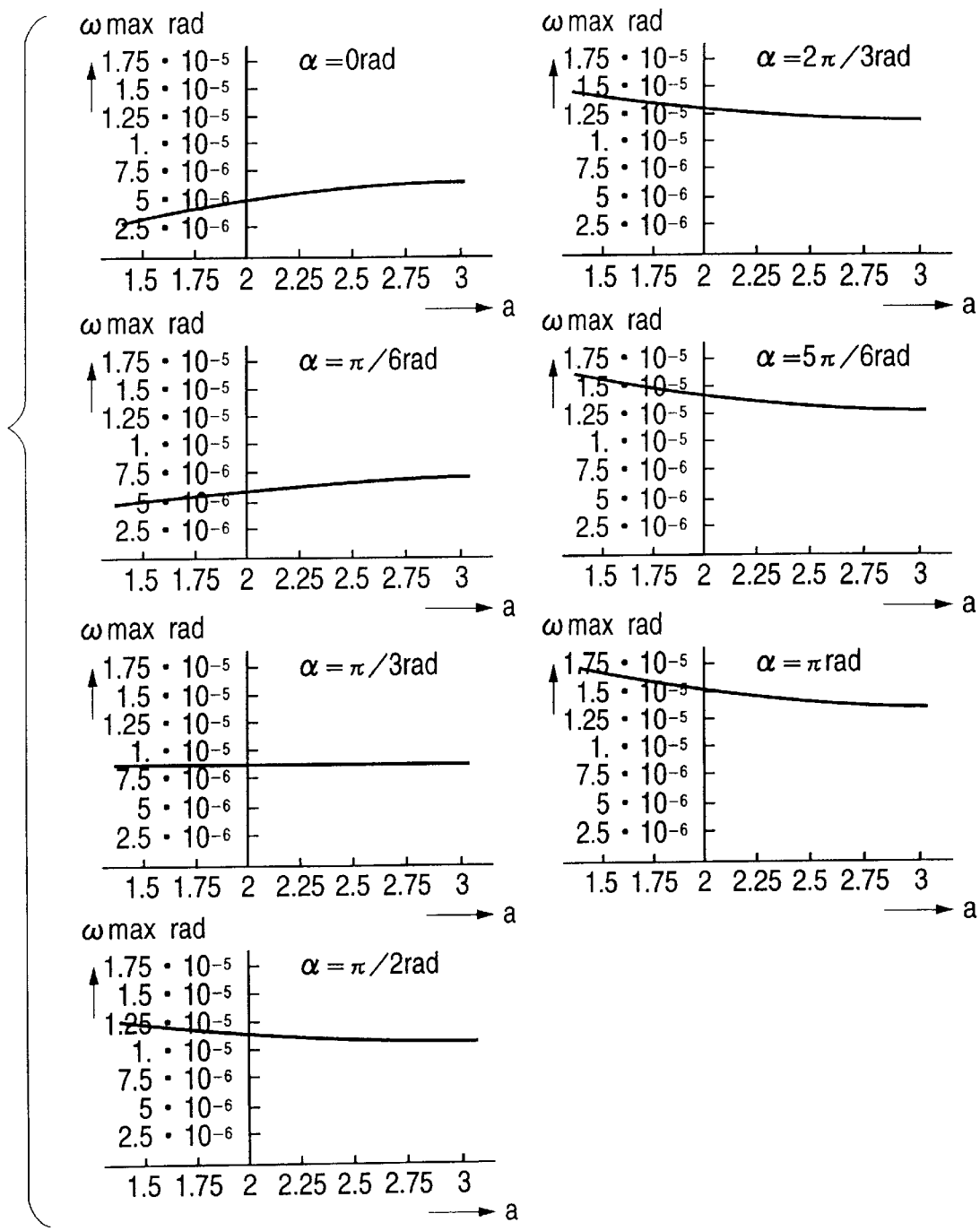
FIG. 14 is a graph showing magnetic head positions and write angle deviations.

Consider specific numerical values for the 6.3-cm (2.5-inch) HDD 21. Assuming that r=10 mm, E=0.1 μm, and 14 mm≤R≤30 mm (if a =R/r, then 1.4≤a≤3), the write angle deviation ωmax is obtained as shown in FIGS. 12 to 14. The range of R indicates the movement of the magnetic head 23a in the disk track radial direction.

FIG. 12 shows three-dimensionally the write angle deviation ωmax at a position a of the magnetic head 23a. FIG. 13 shows the relationship between the LDV angle α and the write angle deviation ωmax at a =1.4, 2.2, and 3. FIG. 14 shows the relationship between the position a of the magnetic head 23a and the write angle deviation ωmax with α=0, π/6, π/3, π/2, 2π/3, 5π/6, and π rad.

According to these results, even when the position a of the magnetic head 23a moves within the range of 1.4 to 3, the write angle deviation (ωmax becomes minimum when α=0 rad, and becomes maximum when α=π rad. The value of the write angle deviation ωmax does not depend on the sign of a as long as the absolute value of the LDV angle α remains the same.

As is obvious from the above description, when the detection direction of the LDV optical head 24 is near a direction perpendicular to a straight line connecting the center of the rotating object and the magnetic head 23a, and the detection position is on the magnetic head 23a side with respect to the center of the rotating object, a clock signal can be formed by the LDV optical head 24 which is least affected by a detection error due to the run out of the rotating object.

As described above, by rotating the rotating object before the rotational position information detecting means identifies rotational position information, information for identifying rotational position information can be detected. This makes it possible to accurately detect a stable rotational position even with a frequency signal that causes dropouts.

In addition, by setting the detection direction of the rotation detection position information detecting means to be near a direction perpendicular to a straight line connecting the center of the rotating object and the information recording head, and also setting the detection position on the information recording head side with respect to the center of the rotating object, accurate position detection can be performed with minimum influence of the run out of the rotating object, and a stable servo track signal can be written in the laser Doppler scheme.

What is claimed is:

1. An apparatus for optically detecting rotational position information of a rotating object, comprising:

a light source;

a detector which is located at a position to receive scattered light from the rotating object when the rotating object is irradiated with a light beam from said light source, and outputs a frequency signal based on the scattered light;

a signal processing system for detecting rotational position information by performing signal processing for the frequency signal from said detector; and a rotation control system for controlling rotation of the rotating object, said rotation control system preliminarily rotating the rotating object in detecting the rotational position information, wherein said signal processing system has a function of fixing a dropout portion of the frequency signal in accordance with a rotational position when the rotating object is preliminary rotated.

2. An apparatus according to claim 1, wherein said signal processing system detects rotational position information from a signal obtained by interpolating a signal into the dropout portion of the frequency signal with reference to a position as an origin of rotation.

3. An apparatus according to claim 2, wherein the interpolated signal is a pulse signal.

4. An apparatus according to claim 3, wherein said signal processing system includes a PLL circuit, and said PLL circuit outputs a pulse signal as rotational position information of the rotating object by performing PLL oscillation on the basis of the frequency signal, and generates a pulse signal while holding the PLL oscillating operation state in an immediately preceding state at the rotational position corresponding to the dropout portion, thereby interpolating the pulse signal.

5. An apparatus according to claim 2, wherein said signal processing system uses an external origin signal when the rotating object is preliminarily rotated, and switches the signal to a rotational position origin signal based on the rotational position information after the rotational position information of the rotating object is identified.

6. An apparatus according to claim 5, wherein the rotational position origin signal synchronizes to a pulse signal originating from the frequency signal.

7. An apparatus according to claim 5, wherein the rotational position origin signal is set at a position other than a position corresponding to the dropout portion.

8. An information recording apparatus for recording information on a rotating object by using an information recording head, comprising:

information recording means for recording information on the rotating object through the information recording head; and rotational position information detecting means for detecting rotational position information of the rotating object, said rotational position information detecting means including:

(1) a light source;

(2) a detector which is located at a position to receive scattered light from the rotating object when the rotating object is irradiated with a light beam from said light source, and outputs a frequency signal based on the scattered light;

(3) a signal processing system for detecting rotational position information by performing signal processing for the frequency signal from said detector; and (4) a rotation control system for controlling rotation of the rotating object, said rotation control system preliminarily rotating the rotating object in identifying the rotational position information, wherein said signal processing system has a function of fixing a dropout portion of the frequency signal in accordance with a rotational position when the rotating object is preliminarily rotated.

9. An apparatus according to claim 8, wherein a detection direction for the rotational position information is near a direction perpendicular to a straight line connecting a rotational center of the rotating object and the information recording head, and a detection position for the rotational position information is on the information recording head side with respect to the center of the rotating object.

10. An information recording method of recording information on a rotating object by using an information recording head, comprising:

executing information recording for the rotating object through the information recording head;

performing rotational position information detection for the rotating object by using a rotational position information detecting apparatus, the rotational position information detecting apparatus including:

(1) a light source;

(2) a detector which is located at a position to receive scattered light from the rotating object when the rotating object is irradiated with a light beam from said light source, and outputs a frequency signal based on the scattered light;

(3) a signal processing system for identifying rotational position information by performing signal processing for the frequency signal from said detector; and (4) a rotation control system for controlling rotation of the rotating object, said rotation control system preliminarily rotating the rotating object in detecting the rotational position information; and causing the signal processing system to fix a dropout portion of the frequency signal in correspondence with a rotational position when the rotating object is preliminarily rotated and form a rotation information signal by interpolating a signal into the dropout portion.

11. A method of manufacturing an information recording medium by recording information on a rotating object using an information recording head, comprising:

preparing a medium;

executing information recording for the medium through the information recording head;

performing rotational position information detection for the medium by using a rotational position information detecting apparatus, the rotational position information detecting apparatus including:

(1) a light source;

(2) a detector which is located at a position to receive scattered light from the rotating object when the rotating object is irradiated with a light beam from said light source, and outputs a frequency signal based on the scattered light;

(3) a signal processing system for detecting rotational position information by performing signal processing for the frequency signal from said detector; and (4) a rotation control system for controlling rotation of the rotating object, said rotation control system preliminarily rotating the rotating object in detecting the rotational position information; and causing the signal processing system to fix a state of a dropout portion of the frequency signal in correspondence with a rotational position when the rotating object is preliminarily rotated and form a rotation information signal by interpolating a signal into the dropout portion.

* * * * *

UNITED STATES PATENT AND TRADEMARK OFFICE
CERTIFICATE OF CORRECTION

PATENT NO.      : 6,829,118 B1
DATED           : December 7, 2004
INVENTOR(S)     : Makoto Takamiya et al.

Figure 1A:
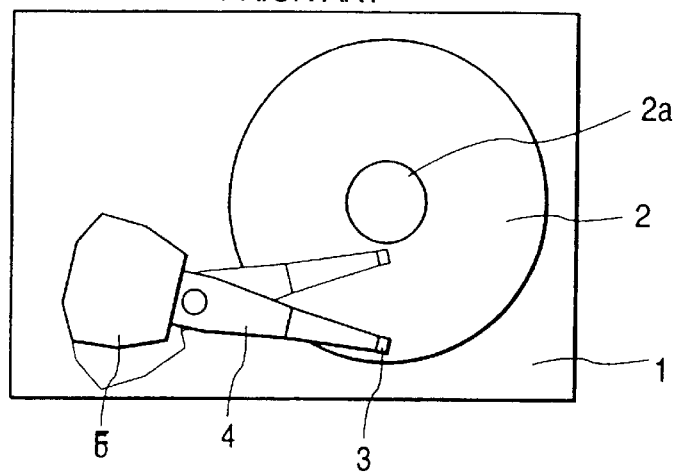
FIG. 1A is a plan view of a conventional HDD.
Figure 1B:
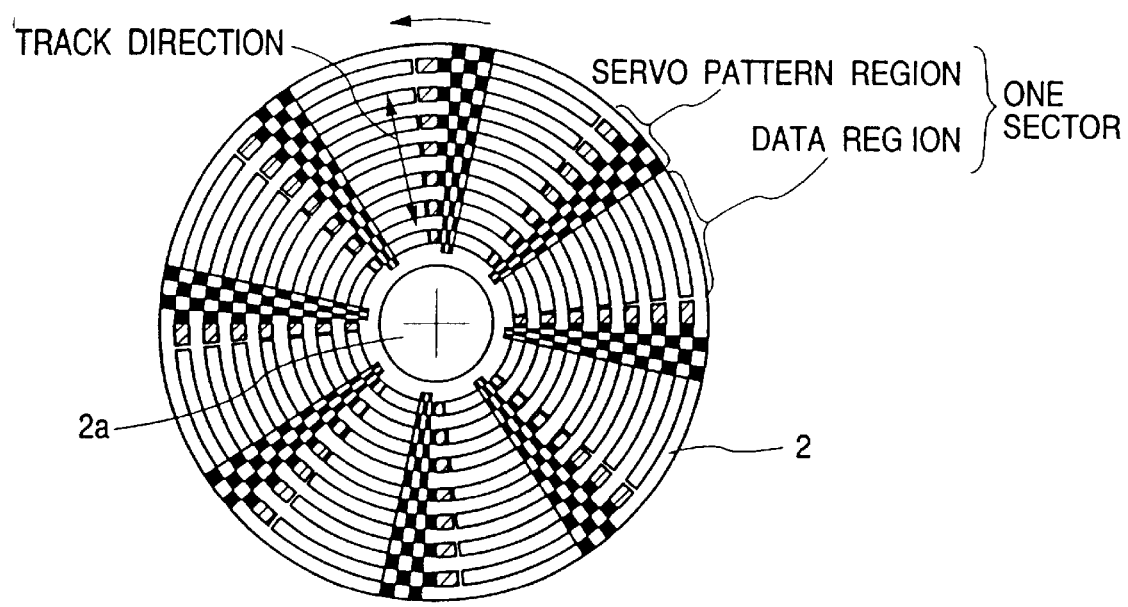
FIG. 1B is a plan view of a magnetic disk.
Figure 1C:
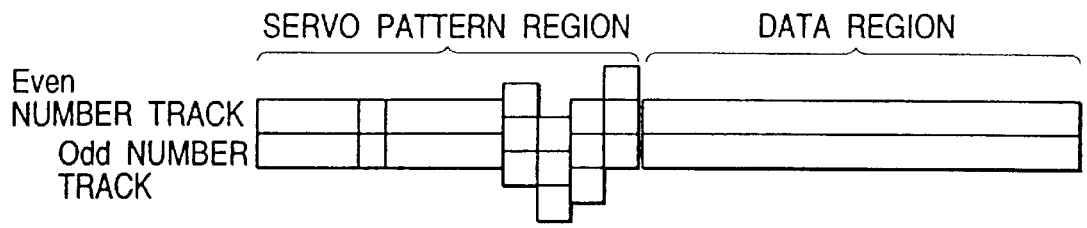
FIG. 1C is a view for explaining a servo pattern on the magnetic disk.
Figure 1D:
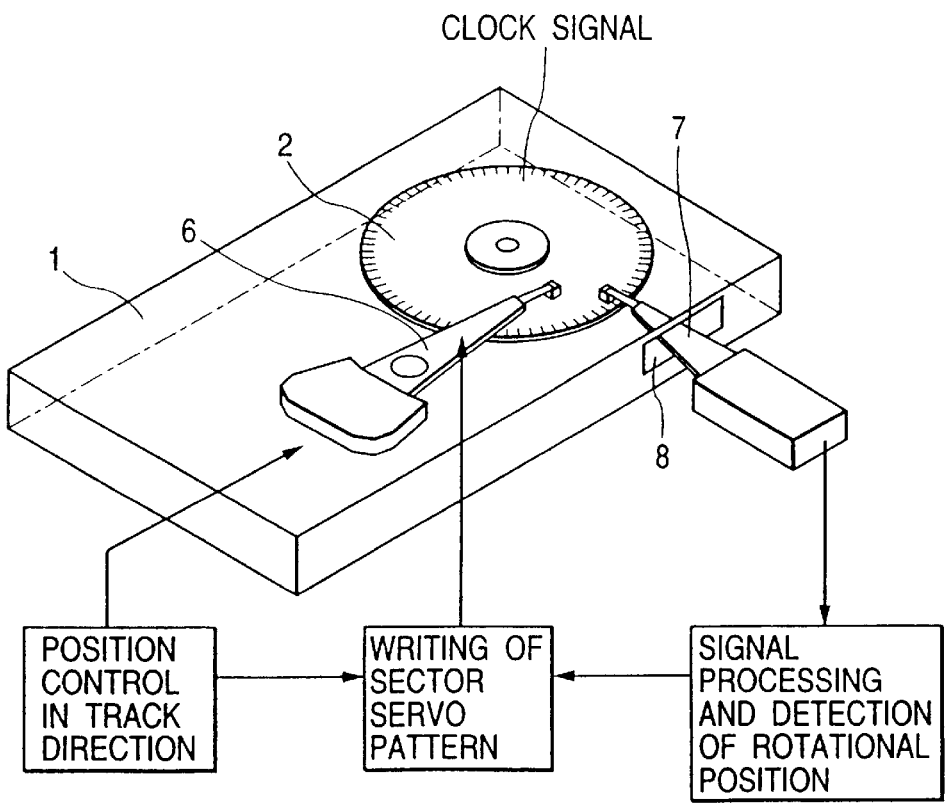
FIG. 1D is a perspective view of the HDD using a magnetic clock head.
Figure 1E:
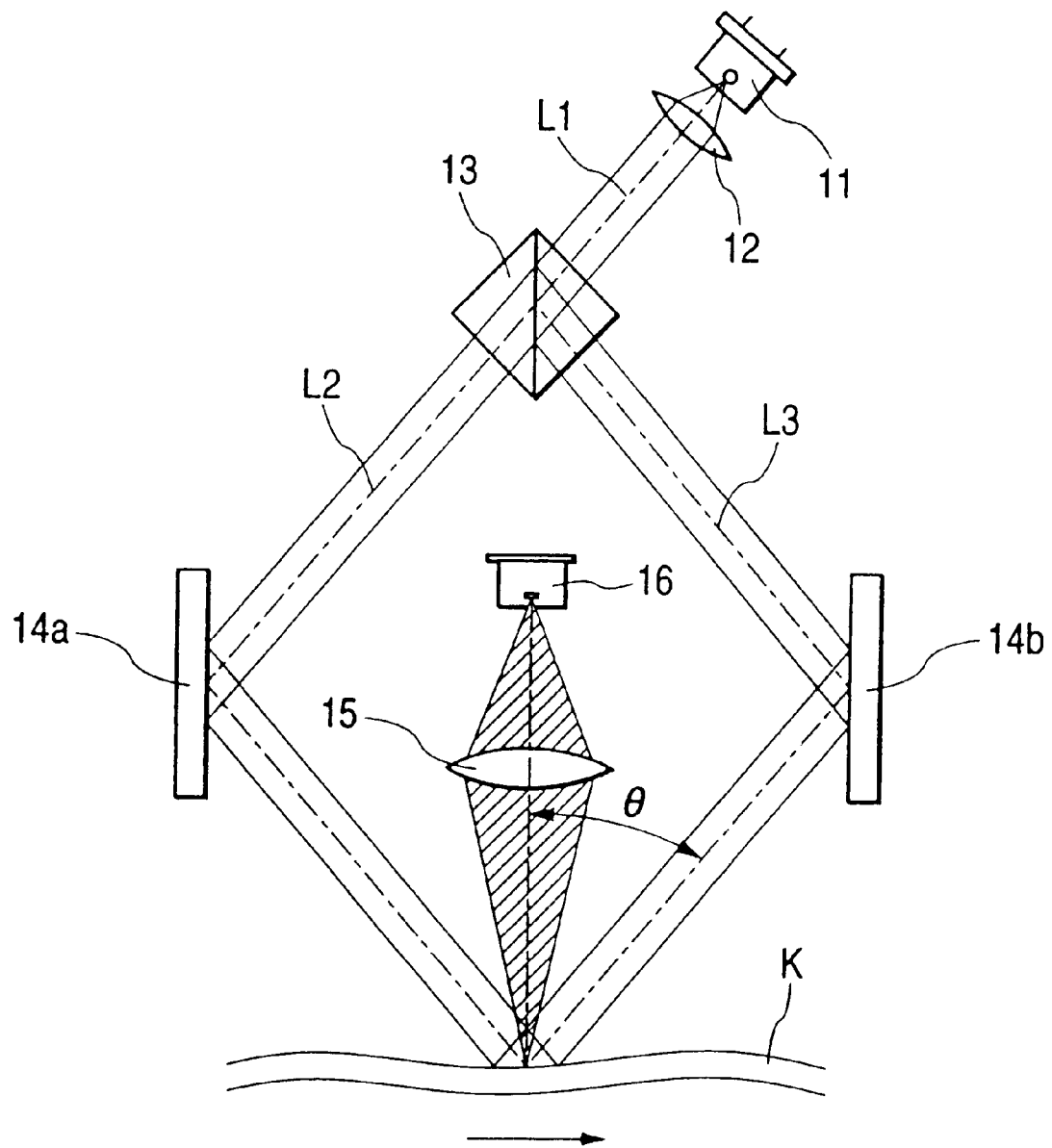
FIG. 1E is a view showing the arrangement of a laser Doppler velocimeter.

It is certified that error appears in the above-identified patent and that said Letters Patent is hereby corrected as shown below:

Drawings,
SHEET 1, FIG. 1B, "DATA REG ION" should read -- DATA REGION --

Column 2,
Line 45, "F = 2Δf" should read -- F = 2Δf = --.

Column 4,
Line 49, "it" should read -- its --.

Column 5,
Line 42, "n D.0." should read -- D.O.n --;
Line 43, "D.0.3., D.0.4., …, D.0.n," should read -- D.O.3., D.O.4.,… D.O.n, --;
Line 47, "de scribed" should read -- described--; and
Line 49, "eliminated.," should read -- eliminated. --.

Column 9,
Line 63, "(cos β - r/R)} |" should read -- (cosα - r/R)} |--

Column 10,
Lines 11-12, equation (15) should read
-- $c = \sin(\pi/2 - \alpha) - r/R = \cos\alpha - r/R$
$d = \cos(\pi/2 - \alpha) = \sin\alpha$
$\sin\Phi = c/(c^2 + d^2)^{1/2}$
$\cos\Phi = d/(c^2 + d^2)^{1/2}$    ...15 --;
Line 21, equation (17) should read
-- $\sin\beta = -c/(c^2 + d^2)^{1/2}$
$\cos\beta = d/(c^2 + d^2)^{1/2}$    ...(17) --;
Line 55, "(ωmax" should read -- ωmax --; and
Line 58, "a as long" should read -- α as long --.

Column 11,
Line 39, "preliminary" should read -- preliminarily --.

UNITED STATES PATENT AND TRADEMARK OFFICE
CERTIFICATE OF CORRECTION

PATENT NO. : 6,829,118 B1
DATED : December 7, 2004
INVENTOR(S) : Makoto Takamiya et al.

It is certified that error appears in the above-identified patent and that said Letters Patent is hereby corrected as shown below:

Column 12,
Line 55, "(3)" should read -- (3) --.

Signed and Sealed this

Twenty-eighth Day of June, 2005

JON W. DUDAS
*Director of the United States Patent and Trademark Office*